United States Patent [19]

Kerins

[11] 4,083,111
[45] Apr. 11, 1978

[54] NUT CUTTER

[75] Inventor: Harry A. Kerins, Wheaton, Ill.

[73] Assignee: H and W Tool Sales, West Chicago, Ill.

[21] Appl. No.: 793,847

[22] Filed: May 5, 1977

Related U.S. Application Data

[63] Continuation of Ser. No. 658,361, Feb. 17, 1976, abandoned.

[51] Int. Cl.² .............................................. B26B 3/00
[52] U.S. Cl. ..................................... 30/168; 30/305; 30/315
[58] Field of Search ........................ 30/305, 315, 168

[56] References Cited

U.S. PATENT DOCUMENTS

| 1,086,993 | 2/1914 | Camanada | 30/315 X |
| 1,589,683 | 6/1926 | Clinger | 30/315 X |
| 3,191,909 | 6/1965 | Reischl | 30/168 X |
| 3,231,972 | 2/1966 | Annese et al. | 30/168 |

Primary Examiner—Gary L. Smith
Assistant Examiner—J. T. Zatarga
Attorney, Agent, or Firm—Haight, Hofeldt, Davis & Jambor

[57] ABSTRACT

A nut cutter for cutting through nuts that are rusted or otherwise frozen to bolts or other threaded fasteners. The working end section of the chisel-like nut cutter includes a pair of bifurcated sharpened tines. The central notch separating the bifurcated tines is shaped to facilitate cutting nuts that are relatively inaccessible using the nut cutter held either coaxially with or at an angle to the longitudinal axis of the nut.

4 Claims, 6 Drawing Figures

U.S. Patent      April 11, 1978      4,083,111
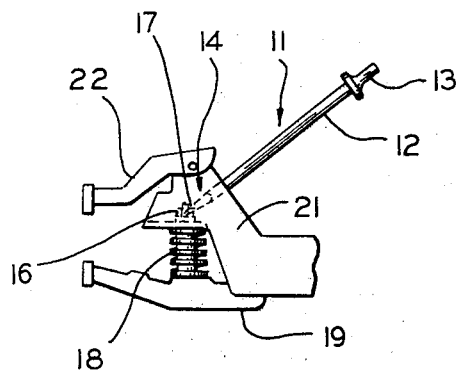
FIG.1
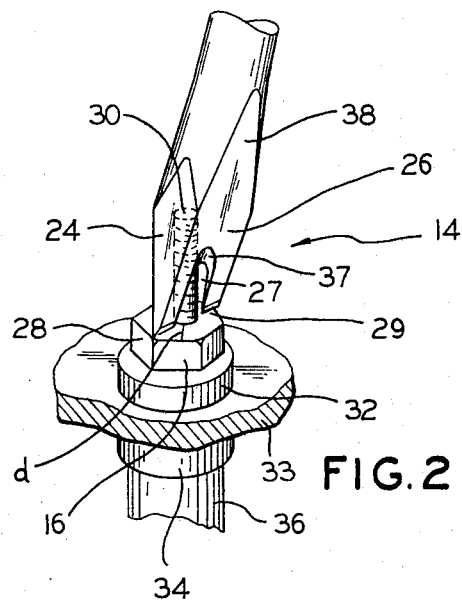
FIG.2
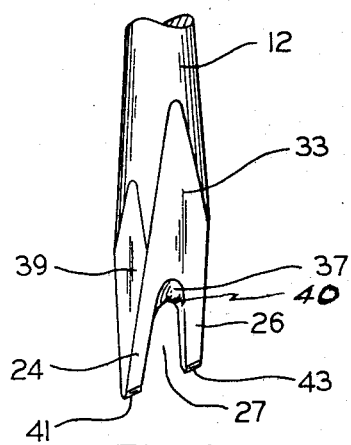
FIG.3
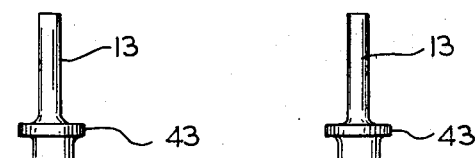
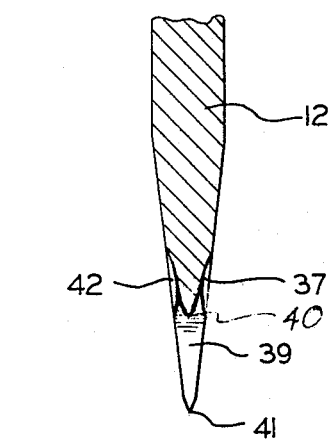
FIG.6
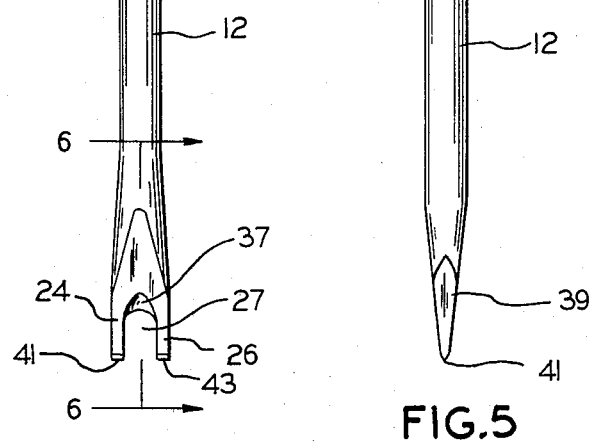
FIG.4      FIG.5

NUT CUTTER

This is a continuation of application Ser. No. 658,361, filed Feb. 17, 1976, now abandoned.

This invention relates to cutting tools and more particularly concerns apparatus for rapidly removing a nut that is rusted or otherwise frozen to a bolt or stud. Very often nuts become frozen to the bolt to which they are fastened. This happens particularly in joining auxiliary automotive parts to the automobiles. For example, the nuts which hold the shock absorbers in place underneath the automobile are exposed to the elements, as well as to extremely adverse environmental conditions. For example, during the winter when streets are spread with salt, the salt becomes encrusted around the nut and stud arrangement holding the shock absorber in place. As the ice and snow, which are also encrusted thereon, melt, the salt solution affects the metal stud and nut so that often the nut is locked in place on the bolt.

When replacing the shock absorber, the only way to remove the nut is by cutting the nut from the stud.

In the past this has been accomplished using a cold chisel or a hack saw. The use of either of these tools on the cramped, inaccessible shock absorber nut was tedious, laborious and time consuming.

The automotive equipment replacement market and the mechanics in particular working in this market have long been seeking an effective tool for removing the frozen nuts. A tool attempting to solve the problem of removing the frozen nuts was descried and claimed in U.S. Pat. No. 3,231,972, entitled CUTTING TOOL FOR REMOVING NUTS FROZEN TO STUDS.

The cutting tool described and claimed in that patent was essentially cylindrical shaped with an internal bore surrounding the central axis and had a pair of cutting edges extending radially outward from the central axis of the inner bore. The length of the bore immediately adjacent to the cutting edges received the end of the stud to which the nut to be removed was frozen.

The patented tool, for practical purposes, could only be used coaxially with the stud to which the nut was attached. If it was used at an angle to the longitudinal axis of the nut, the stud or bolt to which the nut was attached abutted the main body of the tool thereby preventing the tool from cutting through the nut. Thus, the patented tool was effective only where it was possible to obtain unencumbered access to the top of the stud. Further, if the nut was frozen to a bolt, the inner bore of the tool was too narrow to accommodate the head of the bolt. Therefore, the patented tool had very limited usage and accordingly failed to solve problems of effectively removing almost inaccessible nuts that are frozen in place on the threaded fasteners.

Accordingly, an object of the present invention is to provide a new and unique nut cutting tool.

A related object of the invention is to provide a nut cutting tool that can effectively and efficiently remove nuts frozen to bolts as well as studs.

Still another related object of the present invention is to provide nut cutters for removing nuts that are frozen to threaded fasteners, when the nut cutter cannot be utilized in a position coaxial with the longitudinal axis of the nut.

Yet another object of the present invention is to provide a nut cutter that can cut through the frozen nut effectively and efficiently while set at an angle to the longitudinal axis of the nut.

A preferred embodiment of the present invention comprises a characterized chisel-like cutting tool. The working end section of the chisel-like tool has a pair of bifurcated tines. The width of each of the tines is approximately equal to the width of the section of the nuts through which the nut cutter cuts.

The central notch separating the bifurcated tines is wider than the stud or bolt to which the nut is attached. A concave section on each side face of the chisel-like tool assures that the threaded fastener to which the nut is attached will not interfere with the nut cutter while it is being used to remove the frozen nut.

The above-mentioned and other objects and features of the invention will be best understood by making reference to the following description of the invention taken in conjunction with the drawings, wherein:

FIG. 1 is a diagrammatic showing of the nut cutter being used to cut through a nut which holds a shock absorber in place on an automotive vehicle;

FIG. 2 is a pictorial showing of the nut cutter abutting a mounted nut to be removed from around a threaded fastener;

FIG. 3 is a pictorial showing of the cutting end of the nut cutter;

FIG. 4 is a plan view of the nut cutter;

FIG. 5 is a side view of the nut cutter; and

FIG. 6 is a sectional view of the cutting end of the nut cutter taken on a plane through the cutter of FIG. 4 and looking in the direction of the arrows 6—6.

In FIG. 1 the nut cutter tool is shown generally as 11. The tool 11 includes a main body section 12 integrally adjoining an upper section 13 adapted to operatively connect the tool 11 to a power gun (not shown). The main body section terminates in a cutting end 14.

As shown in FIGS. 1 and 2 the nut cutter tool 11 is held abutting a nut, such as nut 16, attached to a threaded fastener, 17. In this case, for purposes of illustration, the nut and fastener are securing a shock absorber, shown schematically as shock absorber 18, mounted between frame section 19 and frame section 21 attached to the ball joint bracket 22. The ball joint bracket 22 is in a position which significantly hinders access to the nut for removing the nut from the threaded fastener. However, with the tool 11 held at an angle to the longitudinal axis of the threaded fastener, it is possible to cut through the nut and release the apparatus secured thereby, such as the shock absorber 18.

The cutting end 14 of tool 11 comprises a pair of bifurcated tines 24 and 26, respectively, separated by a gap or notch 27. The tines 24 and 26 are sharpened to a point at ends 28 and 29, respectively. The ends 28 and 29 are approximately as wide as the material length "d" of nut 16 so that when the nut cutter is forced through the nut, both of the tines 24 and 26 each cut completely through one side of the nut thereby splitting the nut to completely release the apparatus secured by the threaded fastener and the nut.

The pictorial view of FIG. 2 diagrammatically shows the top of the shock absorber 18 of FIG. 1. Below nut 16 is shown a bushing 32 mounted next to the flange section 33 of section 21.

The cutting end of the chisel has concave sections on both faces. For example, there is the concave section 37 on face 38 of FIG. 2.

Looking at the pictorial view of FIG. 3, this concave section 37 in face 33 is shown as being almost an extension of notch 27 between tines 24 and 26.

As shown particularly in FIGS. 3 and 5, the side view of the cutting end shows a tapered portion 39 which tapers to the sharpened points 28 and 29 from the main cylindrical shaft 12.

The concave sections on each of the faces, such as concave sections 37 and 42, are shown particularly in FIG. 6, which is a sectional view taken from FIG. 4. More particularly, these sections serve the multiple functions of first positioning the cutter, and then guiding the cutter while simultaneously directing the maximum impact against nut 28. It should be noted that the bottom concave sections are rounded as shown at 40 to facilitate sliding along the fastener.

The concave sections enable using the chisel-like nut cutter to cut through the nut without any interference from the threaded fastener to which the nut is frozen. The automatic hammer connecting section is shown more clearly in FIGS. 4 and 5. They include the actual section 13 which fits into the automatic hammer receptacle and an integral flange 43 which is shown as being disk-like and of greater diameter than the main body section 12.

In use then, the nut cutter is attached to an automatic tool such as an automatic hammer, by slipping shaft portion 13 into the receptacle therefor, such as flange 43. The sharpened points 28 and 29 are held juxtaposed to the top of a frozen nut with the threaded fastener extending within the groove 27 between tines 24 and 26. If the tool cuts into the nut, the concave sections, such as concave section 37, ensures that the threaded fastener does not interfere with the operation of the nut cutter while cutting through the nut.

As the vibratory motion of the nut cutter forces the sharpened end of the nut cutter through the nut, the nut is speedily and efficiently removed from remotely located, relatively inaccessible places.

While the principles of the invention have been described above in connection with specific apparatus and applications, it is to be understood that this description is made only by way of example, and not as a limitation on the scope of the invention.

I claim:

1. A nut cutter for removing nuts frozen to threaded fasteners, said nut cutter comprising:
   a. an elongated shaft defining a main body for receiving and transmitting force to a pair of tines;
   b. a pair of tines extending from said elongated shaft, said tines having end sharpened cutting edges in alignment with one another, and perpendicular to the longitudinal axis of said shaft, and
   c. a central notch extending from between said tines toward said shaft, a portion of said notch adjacent said tines having a width greater than that of said threaded fastener for extending about said threaded fastener and permitting said tines to engage the surface of said nut on opposite sides of said fastener, said notch terminating in a blunt curved section; said shaft having a concavely curved surface extending from said curved section, and being outwardly inclined in the direction of said shaft, the width of said surface gradually diminishing to a tapered point in the direction of the shaft for resting against said threaded fastener and for obliquely guiding said tines into said nut.

2. An apparatus as recited in claim 1 including means for attaching said elongated shaft to a drive tool.

3. An apparatus as in claim 1 in which said notch is provided with a rounded bottom to facilitate sliding along said fastener.

4. A nut cutter for removing nuts frozen to threaded fasteners, said nut cutter comprising:
   a. an elongated shaft defining a main body for receiving and transmitting force to a pair of tines,
   b. a pair of tines extending from said elongated shaft, said tines having end sharpened cutting edges in alignment with one another; and perpendicular to the longitudinal axis of said shaft;
   c. a central notch extending from between said tines towards said shaft, a portion of said notch adjacent said tines having a width greater than that of said threaded fastener for extending about said threaded fastener and permitting said tines to engage the surface of said nut on opposite sides of said fastener, said notch terminating in a blunt curved section along the center of said shaft, and
   d. said shaft having at least one outwardly surface in the direction of said shaft and having a width exceeding the diameter of said fastener, said surface extending from said curved section along the center line of said shaft at an acute angle relative to said center line for resting against said threaded fastener and for guiding said shaft and said tines into said nut as an acute angle relative to the longitudinal axis of said threaded fastener.

* * * * *